United States Patent [19]
Pacifici

[11] 3,879,356
[45] Apr. 22, 1975

[54] LIGHT-SENSITIVE POLYMERIC COMPOSITIONS

[75] Inventor: James G. Pacifici, Kingsport, Tenn.

[73] Assignee: Eastman Kodak Company, Rochester, N.Y.

[22] Filed: Aug. 29, 1973

[21] Appl. No.: 392,725

[52] U.S. Cl. .......... 260/79.5 NV; 96/88; 117/93.31; 204/159.15; 260/17 R; 260/17.4 ST; 260/17.4 GC; 260/47 ET; 260/80.75; 260/85.7; 260/91.3 VA; 260/209.6; 260/213; 260/233.3 R

[51] Int. Cl. .......................... C08f 3/34; C08f 15/10

[58] Field of Search .... 260/91.3 VA, 85.7, 79.5 NV

[56] References Cited

UNITED STATES PATENTS 2,725,372 11/1955 Minsk .............................. 260/91.3
3,560,465 2/1971 Reynolds .......................... 260/91.3
3,642,783 2/1972 Siegrist et al................ 260/240 CA

*Primary Examiner*—John C. Bleutge

[57] ABSTRACT

A novel class of light-sensitive polymers and their use in photographic reproduction is described. The polymers contain a light-sensitive stilbene moiety selected from the group consisting of stilbenebenzimidazole, stilbenebenzotriazole, stilbenebenzoxazole and stilbenebenzothiazole attached to the polymer backbone. These light sensitive polymers are efficiently crosslinked and insolubilized when exposed to actinic light.

15 Claims, No Drawings

LIGHT-SENSITIVE POLYMERIC COMPOSITIONS

This invention relates to photographic reproduction. In a particular aspect it relates to a novel class of light-sensitive polymers and the use of such polymers in the preparation of photographic images.

It is known in the photographic art to reproduce images by processes which involve imagewise exposure of a coating of a radiation-sensitive material, the solubility of which is differentially modified by the action of radiation, and subsequent treatment of the coating with a solvent or solvent system which preferentially removes portions of the coating in accordance with its exposure to light. Such processes have been employed to prepare lithographic printing plates, stencils, photoresists, and similar photomechanical images. Among the radiation-sensitive materials which have been used in such processes are light-sensitive polymers which are insolubilized or hardened on exposure to light. Typical of these radiation-sensitive materials are the cinnamic acid esters of polyvinyl alcohol such as are described in U.S. Pat. No. 2,725,372.

The different applications in which light-sensitive polymers are used requires that such polymers be available with a variety of photographic and physical characteristics. Thus, there is a continual search for novel light-sensitive polymers which improve upon and differ from existing light-sensitive polymers. I have found a novel class of such light-sensitive polymers which have high photographic speed and a wide range of spectral response even in the absence of a sensitizer.

Accordingly, it is an object of this invention to provide a novel class of light-sensitive polymers.

It is a further object of this invention to provide a novel class of light-sensitive polymers having high photographic speed and a wide range of spectral response.

It is a further object of this invention to provide novel light-sensitive polymers which have high photographic speed and which are sensitive to radiation in the visible region of the spectrum in the absence of a sensitizer.

It is another object of this invention to provide photosensitive compositions and elements containing this novel class of light-sensitive polymers.

It is still another object of this invention to provide processes for preparing photomechanical images employing these novel light-sensitive polymers.

The above and other objects of this invention will become apparent to those skilled in the art from the further description of the invention which follows.

In accordance with the present invention there is provided a novel class of light-sensitive polymers which contain a light-sensitive moiety selected from the group consisting of stilbene-benzimidazole, stilbenebenzoxazole, stilbenebenzotriazole and stilbene-benzothiazole attached to the polymer backbone. The point of attachment of the light-sensitive moiety to the polymer backbone is the carboxyl group attached to the stilbene nucleus. When the polymer backbone is derived from a hydroxyl-containing polymer, the light-sensitive moiety is attached through a carbonyloxy linkage. When the polymer backbone is derived from a polymer containing reactive amino groups, the attachment is through an amido linkage.

The light-sensitive moieties which are attached to the light-sensitive polymers of this invention can be represented by the following structural formula

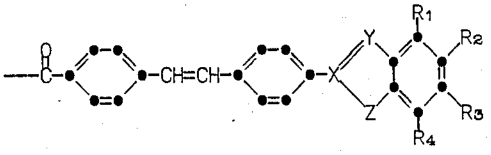

wherein

X is a carbon atom or a nitrogen atom;

Y and Z are an oxygen atom, a sulfur atom, or a nitrogen atom containing an alkyl group having 1 to 12 carbon atoms;

$R_1$, $R_2$, $R_3$ and $R_4$ are hydrogen, lower alkyl, i.e., methyl; substituted lower alkyl, i.e., propylene chloride; cycloalkyl, i.e., cyclohexane; substituted cycloalkyl, i.e., 3-methylcyclohexane; aryl, i.e., benzyl; substituted aryl, i.e., 3-chlorobenzyl; lower alkyl aryl, i.e., 3-methyl benzyl; aryl substituted aryl, i.e., diphenyl; altoxy, i.e., methoxy; amino; carboxy and the substituents $R_1$ and $R_2$; $R_2$ and $R_3$; and $R_3$ and $R_4$ combined with the carbon atoms to which they are attached are joined alkylene groups completing a carbocylic ring, i.e., phenyl, naphthyl and the like.

The polymers which form the backbone of the light-sensitive polymers of this invention and to which the light-sensitive moieties are attached include natural and synthetic resins such as hydroxyl-containing polymers, for example, polyvinyl alcohol, polyvinyl alcohol-co-vinyl acetate, polyvinyl alcohol-co-vinyl benzoate, polyvinyl alcohol-co-vinyl acetate-co-vinyl benzoate; polyethers such as epoxy and phenoxy polymers, e.g., the condensation product of a bisphenol, such as diphenylolpropane, with epichlorohydrin; naturally occurring materials such as cellulose, starch, guar, alginic acid, and their partially esterified or etherified derivatives; polyesters of polyhydroxy intermediates such as glycerol and sorbitol which have hydroxyl groups remaining after incorporation in the polymer chain; polymers containing reactive amino groups, for example, aminostyrene; and anthranilic acid polymers such as polyvinyl anthranilate and the like.

The light-sensitive polymers of the present invention are prepared by the reaction of the hydroxy or amino groups on the polymer backbone with an acid halide of one light-sensitive moiety or the acid halide of a mixture of light-sensitive moieties. This reaction can be carried out in a suitable solvent such as a tertiary amine, for example, pyridine, picoline, lutidine, triethylamine, and the like, at room temperature, or at elevated temperatures up to about 100°C.

When the hydroxyl-containing polymer employed is a polyvinyl alcohol, the light-sensitive polymers which have good solubility and other desirable physical properties can be prepared by the procedure described in U.S. Pat. No. 3,560,465, which is incorporated herein by reference. This procedure involves swelling the polyvinyl alcohol in a tertiary amine solvent followed by partial esterification with an aroyl chloride such as benzoyl chloride. The partially aroylated polyvinyl alcohol is then esterified with the photo-sensitive acid chloride, after which any remaining hydroxyl groups optionally can be esterified with aroyl chloride.

In addition to the light-sensitive groups, the polymers of this invention can contain modifying groups such as other light-sensitive groups, such as cinnamates, as well as non-light sensitive groups, such as benzoate, attached to the polymer backbone. Such other groups are often used in modifying the physical properties of the polymer, such as solubility, adhesivity, melting point, and the like. Useful groups include those derived from aliphatic and aromatic carboxylic acids, such as acetic acid, haloacetic acid, propionic acid, isovaleric acid, succinic acid, glutaric acid, adipic acid, sebacic acid, 2-ethylhexanoic acid, decanoic acid, benzoic acid, halobenzoic acids, nitrobenzoic acids, toluic acids, p-ethylbenzoic acid, p-octylbenzoic acid, p-ethoxybenzoic acid, p-amyloxybenzoic acid, 2-naphthoic acid, and the like. These modifying groups can be attached to the polymer prior to addition of the light-sensitive group, as for example, when an acetylated polyvinyl alcohol is used as the polymer backbone, or when the procedure of U.S. Pat. No. 3,560,465, referred to above, is employed to prepare the light-sensitive polymers of this invention. Alternatively, free reactive groups contained on the polymer backbone after addition of the light-sensitive moiety can be esterified with modifying groups such as acid chlorides, or other suitable reactants, of the modifying groups. The modifying group can comprise up to 75 percent of the groups attached to the polymer backbone. Therefore, from less than 1 percent to about 50 percent of the groups attached to the polymer backbone can be light-sensitive groups as defined by the present invention. Preferably, 1 to 25 percent of the groups attached to the polymer backbone are these light-sensitive moieties.

Coating compositions containing the light-sensitive polymers of this invention can be prepared by dispersing or dissolving the polymer in a suitable organic solvent such as dimethylformamide; ketones such as 4-methyl-2-pentanone, cyclohexanone, etc.; chlorinated hydrocarbon solvents such as chloroform, trichloroethylene, dichloroethane, trichloroethane, tetrachloroethane, etc.; mixtures of these solvents, and the like. Coating compositions can include a variety of photographic addenda utilized for their known purposes, such as agents to modify the flexibility of the coating, agents to modify its surface characteristics, dyes and pigments to impart color to the coating, agents to modify the adhesivity of the coating to the support, and a variety of other addenda known to those skilled in the art.

The polymers of the present invention are useful in a variety of photographic applications to prepare photomechanical images such as lithographic printing plates and photoresists.

Because of the wide range of spectral response and high photographic speed of the light-sensitive polymers of the present invention, it is not necessary to incorporate sensitizers in the photosensitive coating composition containing the light-sensitive polymers of this invention.

The light-sensitive polymers of this invention can be the sole polymeric constituent of the coating composition or another polymer can be incorporated therein to modify the physical properties of the composition and serve as a diluent. For example, phenolic resins, such as thermoplastic Novolac resins, can be incorporated in the compoisition to improve the resistance of the polymer composition to etchants when it is used as a photoresist. Similarly, hydrophillic polymers such as cellulose and its derivatives, polyalkylene oxides, polyvinyl alcohol and its derivaties, and the like, can be incorporated in the composition to improve the hydrophillic properties of the coating when it is used in the preparation of lithographic printing plates. These other polymeric materials can constitute up to 25 percent by weight, based on the weight of the light-sensitive polymer of the coating composition.

Photosensitive elements can be prepared by coating the photosensitive compositions from solvents onto supports in accordance with usual practices. Suitable support materials include fiber base materials such as paper, polyethylene-coated paper, polypropylene-coated paper, parchment, cloth, and the like; sheets and foils of such metals as aluminum, copper, magnesium, zinc, and the like; glass and glass coated with such metals as chromium, chromium alloys, steel, silver, gold, platinum, and the like; synthetic polymeric materials such as polyalkyl methacrylates (e.g., polymethyl methacrylate), polyester film base (e.g., polyethylene terephthalate), polyvinyl acetals, polyamides (e.g., nylon), cellulose ester film base (e.g., cellulose nitrate, cellulose acetate, cellulose acetate propionate, cellulose acetate butyrate), and the like. The optimum coating thickness for a particular purpose will depend upon such factors as the use to which the coating will be put, the particular light-sensitive polymer employed, and the nature of other components which may be present in the coating. Typical coating thicknesses can be from about 0.1 to 10 mils.

Photomechanical images can be prepared with photosensitive elements by imagewise exposing the element to a light source to harden or insolubilize the polymer in exposed areas. Suitable light sources which can be employed in exposing the elements include sources rich in visible radiation and sources rich in ultraviolet radiation, such as carbon arc lamps, mercury vapor lamps, fluorescent lamps, tungsten lamps, photoflood lamps, and the like.

The exposed element can be developed with a solvent for the unexposed, uncrosslinked polymer which is a nonsolvent for the exposed hardened polymer. Such solvents can be selected from the solvents listed above as suitable coating solvents, as well as others known in the art.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A substituted stilbenebenzoxazole, 4'-(2-benzoxazolyl)-4-stilbenecarbonyl chloride, can be prepared as follows:

A mixture of 32.7 g. (0.28 mole) o-aminophenol, 44.9 g. (0.33 mole) p-toluic acid and 100 ml. of 1,2,4-trichlorobenzene is heated at 180°C. for a period of at least 12 hours. The mixture is cooled and added to 500 ml. of heptane. The solution is washed with 5 percent sodium hydroxide solution and then with water. The solvent is stripped off and the product distilled (b.p. 186°C./10 mm.) to give 45 g. (76 percent yield) of 2-(p-tolyl)benzoxazole having a melting point 114°–115°C.

A mixture of 104 g. (0.5 mole) of 2-(p-tolyl)benzoxazole, 82.0 g. (0.5 mole) of methyl formylbenzoate and 500 ml. of hexamethyl-phosphoric triamide (HPT) is warmed on a steam bath to effect solution.

This warm solution is added in a thin stream to a stirred suspension of 108 g. (2.0 moles) of sodium methoxide in 1 liter of HPT under nitrogen.

The mixture is stirred 15 hr. without external heating or cooling, then poured into 1.5 liter of 4M HCl, and stirred. The precipitate is collected by filtration, slurried with 3 liters of water, then collected and reslurried with 3 liters of methanol.

The precipitate is dried at 100°C. to give 154.2 g. of yellow solid. This crude product is stirred 0.5 hr. with 1.25 liter of boiling isopropyl alcohol, then collected and air-dried to give 127.5 g. (75 percent yield) of 4'-(2-benzoxazolyl)-4-stilbenecarboxylic acid; m.p. 363°C. by Differential Scanning Calorimeter.

A mixture of 34 g. (0.1 mole) of the acid 4'-(2-benzoxazolyl)-4-stilbenecarboxylic acid, 100 g. of sodium carbonate and 500 ml. of thionyl chloride is stirred at room temperature for 2 days. The acid dissolves during this time. The carbonate is removed by filtration and the filtrate added to ether to precipitate the product. The collected product is dried in a vacuum desiccator for two days. Isolated is 25 g. (67 percent) of the desired acid chloride, 4'-(2-benzoxazolyl)-4-stilbenecarbonyl chloride.

EXAMPLE 2

A substituted stilbenebenzoxazole, 4'-[5-methoxy-2-(p-tolyl)-benzoxazolyl]-4-stilbenecarbonyl chloride, can be prepared as follows:

A mixture of 40.2 g. (0.14 mole) of 4-methoxy-2-nitrophenyl p-toluate and 139 g. (0.84 mole) of triethyl phosphite is heated to 150°C. The mixture is then heated to reflux (160°–165°C.) for 1.5 hr., and distilled at 5-mm. pressure to remove most of the excess triethyl phosphite. The cooled residue is diluted with 75 ml. of ethanol and filtered to yield 22 g. (66 percent) of 5-methoxy-2-(p-tolyl)benzoxazole, m.p. 113°–116°C.; recrystallization from ethanol yielded 17 g. of 5-methoxy-2-(p-tolyl)benzoxazole having a m.p. 114.5°–116°C.

The 4'-(5-methoxy-2-benzoxazolyl)-4-stilbenecarboxylic acid is prepared by the procedure used in Example 1; yield after recrystallization from dimethyl formamide is 52 percent; m.p. 229°C. by Differential Scanning Calorimeter. The acid is then converted to the acid chloride according to the procedure of Example 1.

EXAMPLE 3

A substituted stilbenebenzoxazole, 4'-[6-methyl-2-(p-tolyl)-benzoxaxolyl]-4-stilbenecarbonyl chloride can be prepared as follows:

6-Methyl-2-(p-tolyl)benzoxazole is prepared in 80 percent yield as described in Example 2 using 5-methyl-2-nitrophenyl p-toluate (m.p. 110°–112°C.). The 4'-(6-methyl-2-benzoxazolyl)-4-stilbenecarboxylic acid is then prepared according to the procedure of Example 2. The yield of the acid after recrystallization from 1,2,4-trichlorobenzene is 35 percent; m.p. 334°C. by Differential Scanning Calorimeter. The acid is converted to the acid chloride according to the procedure of Example 2.

EXAMPLE 4

A substituted stilbene benzimidazole, 4'-(1-methyl-2-benzimidazolyl)-4'-stilbenecarbonyl chloride, can be prepared as follows:

N-(p-Nitrophenyl)-p-toluamide (m.p. 108°–113°C.) is prepared in 92 percent yield by reaction of o-nitroaniline with p-toluoyl chloride in dry pyridine. A slurry of this amide (38 g., 0.15 mole) in 100 ml. of dry dimethyl formamide is stirred while 7.0 g. (0.15 mole) of 55 percent sodium hydride-mineral oil dispersion is added. After 0.5 hr., methyl iodide (15.4 g., 0.18 mole) is added dropwise over a period of 1.0 hr. The mixture is treated with water and benzene, and the benzene solution is washed with water and evaporated to yield an oil which crystallizes when triturated with ether. Filtration yields 31.5 g. (75 percent) of N-methyl-N-(o-nitrophenyl)-p-toluamide, m.p. 96°–99°C. The methylated amide (26 g., 0.10 mole) is reduced over Raney nickel at 100°C. and 1,000 psi. hydrogen pressure, and the crude reduction product is heated for 5 hr. in refluxing diphenyl ether. After removal of diphenyl ether under vacuum, the residue is recrystallized from cyclohexane and dioxane to yield 1-methyl-2-(p-tolyl)benzimidazole, m.p. 125°–128°C.

4'-(1-Methyl-2-benzimidazolyl)-4'-stilbenecarboxylic acid is prepared by the procedure used in the preparation of Example 3; yield after recrystallization from dimethyl formamide is 8.5 percent; m.p. 340°C. by Differential Scanning Calorimeter. The acid chloride is prepared from the stilbenecarboxylic acid according to the procedure of Example 2.

EXAMPLE 5

A substituted stilbenenaphthotriazole, 4'-(2H-naphtho[1,2-d]triazol-2-yl)-4-stilbenecarbonyl chloride, can be prepared as follows:

A mixture of 21.4 g (0.2 mole) of p-toluidine and 100 ml. of acetic acid is cooled to 2°C. and treated with 50 ml. of 2.5N $NaNO_2$. This mixture is then added to a suspension of 28.6 g. (0.2 mole) 2-naphthylamine in 40 ml. 2.5N HCl in 400 ml. of $H_2O$ and cooled quickly to 10°C. After 6 hours at 10°C. the precipitated product is isolated by filtration and recrystallized from ethanol. Isolated is 47 g. (90 percent yield) of azo compound. This material, 5.2 g. (0.02 mole), dissolves in 100 ml. pyridine; 100 ml. $H_2O$ is treated with 18 g. copper sulfate and heated to boil for 2 hours. The mixture is added to 200 ml. $H_2O$, cooled and the precipitated product recrystallized from ethanol. Isolated is 4.9 g. (98 percent yield) of 2 -(p-tolyl)naphthotriazole; m.p. 148°–149°C.

4'-(2H-Naphtho[1,2-d]triazol-2-yl)-4-stilbenecarboxylic acid is prepared from 2-(p-tolyl)naphthotrizole and the carbonyl chloride is prepared from the carboxylic acid by the procedure used in the preparation of Example 3; yield after recrystallization from 1,2,4-trichlorobenzene is 45 percent; m.p. 352°C. by Differential Scanning Calorimeter.

EXAMPLE 6

A substituted stilbene benzothiazole, 4'-(2-benzothiazolyl)-4-stilbenecarbonyl chloride, can be prepared as follows:

A mixture of 12.5 g. (0.1 mole) of o-aminothiophenol, 13.6 g. (0.1 mole) of p-toluic acid and 150 g. polyphosphoric acid is heated slowly to 250°C. The mixture is stirred and heated for 4 hours at 250°C., cooled to 100°C. and poured into a large volume of water. The insoluble material is filtered, washed with water, reslurried with 10 percent aqueous sodium carbonate and filtered. Isolated after drying and recrystallization from ethanol is 9.8 g. (44 percent) of 2-(p-tolyl)benzothiazole; m.p. 84°–85°C.

4'-(2-benzothiazolyl)-4-stilbenecarboxylic acid is prepared from the 2-(p-tolyl) benzothiazole by the procedure used in the preparation of Example 3; yield after recrystallization from 1,2,4-trichlorobenzene is 48 percent; m.p. 334°C. by Differential Scanning Calorimeter. The carbonyl chloride is prepared from the carboxylic acid also by the procedure of Example 3.

EXAMPLE 7

A mixture of 5.0 g. polyvinyl alcohol (Vinol 523, 12 percent acetyl) and 100 ml. of dry pyridine is heated on a steam bath overnight. After cooling, 3.7 g. (0.01 mole) of 4'-(2-benzoxazolyl)-4-stilbenecarbonyl chloride is added to the reaction flask and the mixture heated for 12 hours over a waterbath at 50°C. To this mixture is then added 12.5 g. (0.096 mole) of benzoyl chloride and the mixture heated for an additional 3 hours. The mixture is cooled, 600 ml. of acetone added, and the soluble product filtered. The acetone solution is poured into water and the precipitated polymer isolated by filtration. After air drying for 24 hours, the polymer is dissolved in chloroform and precipitated from methyl alcohol. The yield of dried product is 14.5 g. Fluorescence analysis $\lambda_{max}$. excitation 364 nm.; $\lambda_{max}$. emission 416 nm.) confirmed the presence of the stilbenezoxazole moiety.

EXAMPLE 8

A mixture of 5 g. Eponol 55B-40 (a phenoxy type resin from bisphenol A and epichlorohydrin), 75 ml. of dry pyridine and 75 ml. of methylene chloride is heated gently for 1 hour at 50°C. To this mixture is added 5.0 g. (0.013 mole) of 4'-(2-benzoxazolyl)-4-stilbenecarbonyl chloride and the mixture is heated for 24 hours at 50°C. The solution is diluted with 200 ml. of methylene chloride and the product precipitated by adding the solution to methanol. The precipitated product is collected by filtration and air dried overnight.

EXAMPLE 9

Films (0.5 mil) of the light-sensitive polymers prepared according to Examples 7 and 8 are cast on aluminum supports from appropriate solvents with a Garner Film Casting Knife. For the polymer prepared in Example 7 acetone/benzene (50/50) is used as the solvent and for the polymer prepared in Example 8 dichloroethane is used as the solvent. Samples are exposed through a negative mask to a 250-watt medium pressure Hanovia mercury lamp at a distance of 15 cm. The exposure time for all samples is 1 minute and the samples are developed for 5 minutes in the appropriate solvent. This exposure time is sufficient to render the exposed portions insoluble in the developer solution.

EXAMPLE 10

The following polymer compositions are prepared by reacting Eponol 55B-40 according to the procedure of Example 8 with the light-sensitive moieties in the following amounts.

I. 5% 4'-(2-benzoxazolyl)-4-stilbenecarboxylate
II. 10% 4'-(2-benzoxazolyl)-4-stilbenecarboxylate
III. 5% 4'-(2-benzothiazolyl)-4-stilbenecarboxylate
IV. 7% 4'-(1-methyl-2-benzimidazolyl)-4'-stilbenecarboxylate
V. 5.5% 4'-(6-methyl-2-benzoxazolyl)-4-stilbenecarboxylate
VI. 5% 4'-(5-methoxy-2-benzoxazolyl)-4-stilbenecarboxylate
VII. 4.8% 4'-(2H-naphtho[1,2-d]triazol-2-yl) 4-stilbenecarboxylate Samples of these polymers are coated on aluminum supports and tested for relative sensitivity according to the method of Minsk and co-workers as described in L. M. Minsk et al., J. Appl. Polymer Sci. 2, 302 (1959).

Table 1

| Polymer | Spectral Response | Relative Speed |
|---|---|---|
| 1. polyvinyl-cinnamate | 270–360 | 1 |
| I | 270–460 | 1500 |
| II | 270–460 | 1650 |
| III | 270–460 | 1000 |
| IV | 270–460 | 800 |
| V | 270–460 | 900 |
| VI | 270–460 | 900 |
| VII | 270–460 | 500 |

This invention has been described in detail with particular reference to certain preferred embodiments thereof, but it will be understood that variations and modifications can be effected within the spirit and scope of the invention.

I claim:

1. A solid light sensitive polymer comprising a polymer selected from the group consisting of polyvinyl alcohol, polyvinyl alcohol-co-vinyl acetate, polyvinyl alcohol-co-vinyl benzoate and polyvinyl alcohol-co-vinyl acetate-co-vinyl benzoate having a light-sensitive stilbene moiety selected from the group consisting of stilbenebenzimidazole, stilbenebenzoxazole, stilbenebenzotriazole, and stilbenebenzothiazole attached to the polymer backbone by the reaction of at least one hydroxy group on the polymer backbone with at least one acid halide group of said light-sensitive moiety.

2. A solid light-sensitive polymer according to claim 1 wherein the light-sensitive moiety has the formula

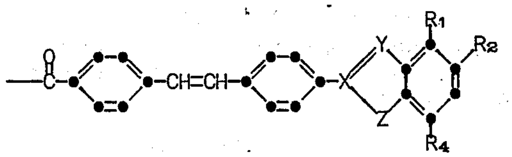

wherein

X is a carbon atom or a nitrogen atom;

Y and Z are an oxygen atom, a sulfur atom, a nitrogen atom, or a nitrogen atom containing an alkyl group having 1 to 12 carbon atoms;

$R_1$, $R_2$, $R_3$ and $R_4$ are hydrogen, lower alkyl, substituted lower alkyl, cycloalkyl, substituted cycloalkyl, aryl, substituted aryl, lower alkyl aryl, aryl substituted aryl, alkoxy, amino, carboxy and the substituents $R_1$ and $R_2$, $R_2$ and $R_3$, $R_3$ and $R_4$ combined with the carbon atoms to which they are attached are joined alkylene groups completing a carboxylic ring.

3. A solid light-sensitive polymer according to claim 2 wherein said X, Y and Z are nitrogen atoms.

4. A solid light-sensitive polymer according to claim 3 wherein said light-sensitive stilbenebenzoxytriazole moiety is 4'-(2H-naphtho-[1,2-d]triazol-2-yl)-4-stilbenecarboxylate.

5. A solid light-sensitive polymer according to claim 2 wherein said X is a carbon atom.

6. A solid light-sensitive polymer according to claim 5 wherein said Y is a nitrogen atom.

7. A solid light-sensitive polymer according to claim 6 wherein said Z is a nitrogen atom.

8. A solid light-sensitive polymer according to claim 5 wherein said light-sensitive stilbenebenzimidazole moiety is 4'-(1-methyl-2-benzimidazolyl)-4-stilbenecarboxylate.

9. A solid light-sensitive polymer according to claim 4 wherein said Z is an oxygen atom.

10. A solid light-sensitive polymer according to claim 7 wherein said light-sensitive stilbenebenzoxazole moiety is 4'-(2-benzoxazolyl)-4-stilbenecarboxylate.

11. A solid light-sensitive polymer according to claim

9 wherein said light-sensitive stilbenebenzoxazole moiety is 4'-(6-methyl-2-benzoxazolyl)-4-stilbenecarboxylate.

12. A solid light-sensitive polymer according to claim 9 wherein said light-sensitive stilbenebenzoxazole moiety is 4'-(5-methoxy-2-benzoxazolyl)-4-stilbenecarboxylate.

13. A solid light-sensitive polymer according to claim 6 wherein said Z is a sulfur atom.

14. A solid light-sensitive polymer according to claim 13 wherein said light-sensitive stilbenebenzothiazole moiety is 4'-(2-benzothiazolyl)-4-stilbenecarboxylate.

15. A solid light-sensitive polymer according to claim 1 wherein said light-sensitive stilbene moiety is attached to a hydroxyl group containing polyvinyl alcohol polymer backbone.

* * * * *